United States Patent [19]

Kapogiannis et al.

[11] Patent Number: 5,481,675
[45] Date of Patent: Jan. 2, 1996

[54] ASYNCHRONOUS SERIAL COMMUNICATION SYSTEM FOR DELAYING WITH SOFTWARE DWELL TIME A RECEIVING COMPUTER'S ACKNOWLEDGEMENT IN ORDER FOR THE TRANSMITTING COMPUTER TO SEE THE ACKNOWLEDGEMENT

[75] Inventors: Chris T. Kapogiannis, Poughkeepsie; John F. Harmuth, Pleasant Valley, both of N.Y.

[73] Assignee: International Business Machines Corporation, Armonk, N.Y.

[21] Appl. No.: 881,593

[22] Filed: May 12, 1992

[51] Int. Cl.[6] .............................. G06F 13/00; G06F 13/14
[52] U.S. Cl. ........................... 395/200.13; 395/200.05; 395/500; 395/550; 364/232.22; 364/228; 364/239.1; 364/230.4
[58] Field of Search ................................ 395/425, 725, 395/500, 275, 550; 364/200, 900, 270.5, 270.6, 270.7; 371/5.5; 375/38

[56] References Cited

U.S. PATENT DOCUMENTS

| | | | |
|---|---|---|---|
| 3,974,479 | 8/1976 | Kotoh et al. | 364/200 |
| 4,050,096 | 9/1977 | Bennett et al. | 364/200 |
| 4,330,824 | 5/1982 | Girard | 264/200 |
| 4,390,969 | 6/1983 | Hayes | 364/900 |
| 4,455,661 | 6/1984 | Qureshi | 375/381 |
| 4,476,527 | 10/1984 | Clayton, IV | 364/200 |
| 4,486,833 | 12/1984 | Daudelin | 395/275 |
| 4,660,169 | 4/1987 | Norgren et al. | 364/900 |
| 4,672,570 | 1/1987 | Benken | 364/900 |
| 4,710,917 | 12/1987 | Tompkins et al. | 370/62 |
| 4,855,901 | 8/1989 | Planteline | 364/200 |
| 4,891,709 | 1/1990 | Adams | 358/256 |
| 4,943,907 | 7/1990 | Godwin | 395/775 |
| 5,040,109 | 8/1991 | Bowhill et al. | 395/550 |
| 5,060,239 | 10/1991 | Briscoe et al. | 375/38 |
| 5,070,443 | 12/1991 | Priem et al. | 395/725 |
| 5,121,492 | 6/1992 | Saville, III et al. | 395/500 |
| 5,125,088 | 6/1992 | Culley | 395/550 |
| 5,151,986 | 9/1992 | Langan et al. | 395/550 |
| 5,220,659 | 1/1993 | Larson et al. | 395/500 |
| 5,237,670 | 8/1993 | Wakerly | 395/425 |
| 5,237,696 | 8/1993 | Best | 395/725 |
| 5,268,906 | 12/1993 | Free | 371/5.5 |
| 5,301,307 | 4/1994 | Murooka et al. | 395/550 |
| 5,313,621 | 5/1994 | Chan | 395/550 |
| 5,388,250 | 2/1995 | Lewis et al. | 395/550 |

FOREIGN PATENT DOCUMENTS

| | | |
|---|---|---|
| 0304540 | 10/1982 | European Pat. Off. . |
| 0275135 | 1/1988 | European Pat. Off. . |
| 0386935 | 2/1990 | European Pat. Off. . |

*Primary Examiner*—Thomas C. Lee
*Assistant Examiner*—Marc K. Weinstein
*Attorney, Agent, or Firm*—Whitham, Curtis, Whitham & McGinn; Eric W. Petraske

[57] ABSTRACT

A software asynchronous communication protocol between two computers allows the roles of master and slave to be switched between the computers, depending on the nature and direction of the communication. In order to avoid truncating bit strings transmitted between the computers due to a difference in the write/read cycles of the computers, the software incorporates a dwell to accommodate the slowest computer in the system.

7 Claims, 8 Drawing Sheets

COMMAND ACKNOWLEDGEMENT (COMPUTER TO MICRO) AND STATUS ACKNOWLEDGEMENT (MAIN COMPUTER TO MICRO MAIN COMPUTER)

ASYNCHRONOUS SERIAL COMMUNICATION SYSTEM FOR DELAYING WITH SOFTWARE DWELL TIME A RECEIVING COMPUTER'S ACKNOWLEDGEMENT IN ORDER FOR THE TRANSMITTING COMPUTER TO SEE THE ACKNOWLEDGEMENT

BACKGROUND OF THE INVENTION

1. Field of the Invention

The present invention generally relates to digital communications and, more particularly, to asynchronous communications between two or more computers wherein the computers are continuously connected by a physical link but operate autonomously between communications. The invention has particular application to computer controlled manufacturing processes and tools. In a process control environment, a main computer coördinates a series of tasks by interfacing with various types of peripheral equipment. These peripherals can be inputs (e.g., pressure or proximity sensors) or outputs (e.g., actuators or motors) controlled directly by the main computer or indirectly by a slave computer. In the case of a distributed system where a main computer communicates asynchronously with one or more slave computers, the most common interface is the RS-232-C serial input/output (I/O) standard.

2. Description of the Prior Art

There are a number of standards organizations which are important to the establishment of industry standards for digital communications. Among these are the Electronics Industries Association (EIA) and the International Standards Organization (ISO). The EIA publishes standards such as RS-232-C that govern the electrical characteristics of connections between computers and various peripherals. The RS-232 connection is a standard serial input/output (I/O) connection, and the connector normally used for this connection is the DB-25 connector, the design of which is controlled by ISO document 2113.

Within the RS-232 standard, there exist two types of communication; half-duplex and full-duplex. In half-duplex communication, blocks of data can be transmitted in both directions, but in only one direction at a time. Traditional hardware handshaking for half-duplex communication between a DTE (data terminal equipment) and a DCE (data communications equipment) is as follows:

1. The DTE processor initiates contact by raising the data terminal ready (DTR) line.

2. The DCE processor responds by raising the data set ready (DSR) line.

3. The DTE processor continues by raising the request to send (RTS) line.

4. The DCE processor responds by raising the clear to send (CTS) line.

5. Data transmission from the DTE to DCE begins. The foregoing protocol is an example of hardware "handshaking". In addition to the hardware handshaking, various protocols can be incorporated in the data string to provide dam integrity. Examples are parity, check sum, byte count and framing characters.

In full-duplex communication, blocks of data can be transmitted in both directions at the same time. These two-way channels do not require RTS/CTS handshaking leading to a more efficient interface. The disadvantage is the complexity of frequency division multiplexing (FDM) required to prevent interference.

While the RS-232 handshaking protocol, which is an industry standard, works well for most computer communications, a problem has been encountered in applying this protocol to a computer controlled manufacturing environment. More specifically, a manufacturing tool which performs a complex series of operations can be effectively controlled by a plurality of micro computers, thereby dividing the tool into a plurality of less complex "subtools" each controlled by one of the micro computers. The micro computers, however, typically do not have sufficient capacity to perform more than a limited number of tasks and, in any case, must be coordinated so that the sequence of operations is performed as designed. The task of coordinating the several micro computers is usually assigned to a main computer.

The main computer thus controls the tool sequencing, while the micro computers are responsible for specific tasks, such as motion control. In this configuration, there are two types of communication; command communication and status communication. When the main computer communicates a task or command to a micro computer in order to begin a tool operation, the main computer is considered the master and the micro computer is the slave. On the other hand, when the micro computer has finished the task or command, it initiates communication with the main computer to update its progress. In this case, the micro computer is considered the master and the main computer is the slave.

Between communications, the main computer and the micro computers operate autonomously, even though they remain physically connected via a cable link. From this example, it can be seen that an individual computer will alternate from a master to a slave. This state change of each computer precludes the use of the EIA industry standard hardware RS-232 handshaking protocol.

SUMMARY OF THE INVENTION

It is therefore an object of the present invention to provide a serial communications link between computers which allows the computers to operate autonomously except when an asynchronous communication is initiated by any one of the computers under a protocol that allows the computers assume the roles of master or slave, depending on the nature and direction of the communication.

According to the invention, a software asynchronous communication protocol is provided which allows the roles of master and slave to be switched between the computers, depending on the nature and direction of the communication. In order to avoid truncating bit strings transmitted between the computers due to a difference in the WRITE/READ cycles of the computers, the software incorporates a dwell to accommodate the slowest computer in the system.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The invention is described in terms of a specific implementation in the field of process control where a main computer communicates with a plurality of micro computers. The main computer transmits one or more commands to each of the micro computers, and the micro computers operate autonomously, transmitting status upon completion of each command. It will, however, be understood by those skilled in the digital communication art that the invention is not limited to a process control environment and may be applied to other areas of computer communications where a main computer communicates with a plurality of other computers.

Figure 1:
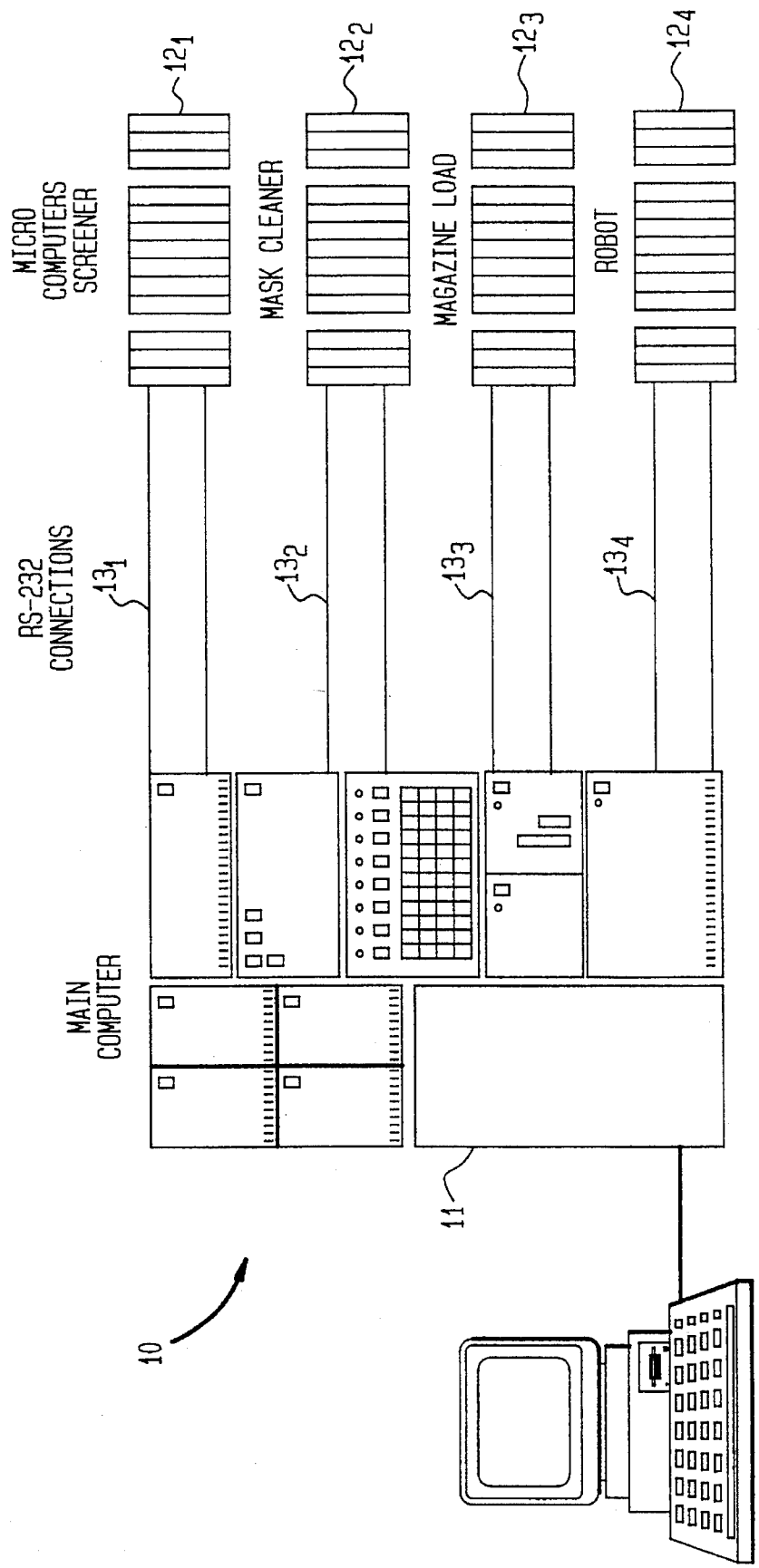
FIG. 1 is a block diagram showing an example of a computer control system for a manufacturing tool on which the invention may be implemented.

Referring now to the drawings, and more particularly to FIG. 1, there is shown an example of a tool control application 10 employing multiple computers used in the operation of a tool (not shown). A main computer 11 controls the tool sequencing, while a plurality of micro computers $12_l$ to $12_n$ are responsible for specific tool tasks. In a specific embodiment, the computer 11 may be an IBM Series/1 computer, and the micro computers may be based on industry standard microprocessors, such as the Motorola 68000 series or the Intel ix86 series of microprocessors. Of course, different computers could be used and, depending on the application and resources available, it is not necessary that all the micro computers $12_l$ to $12_n$ be of the same type. The micro computers are typically mounted in a rack (not shown) and, for the sake simplifying the illustration, are represented by four functions, a screener function $12_l$, a mask cleaner function $12_2$, a magazine loader function $12_3$ and a robot function $12_4$, as might be used in an integrated circuit (IC) processing facility. Each of these micro computers $12_l$ to $12_4$ are connected to the main computer 11 via respective standard RS-232 connections $13_1$, $132_2$, $13_3$, and $13_4$.

Due to the complex series of operations encountered in the IC manufacturing environment, the Series/1 computer 11 delegates tasks to a plurality of less complex subtools, each controlled by a micro computer $12_1$ to $12_4$. The main computer 11 thus controls the tool sequencing, while the micro computers $12_1$ to $12_4$ are responsible for specific tasks such as motion control.

In the specific application shown in FIG. 1, it is desirable to employ a full-duplex communication channel. More specifically, using a full-duplex communication channel, the main computer 11 would communicate one or more tasks or commands to a micro computer $12_i$ in order to begin a tool function. In response to the command, the micro computer $12_i$ would start the task, monitor progress and report back upon completion. The main computer 11 would thereby be updated and then send the next group of tasks or commands to the micro computer $12_i$. Using this full-duplex interface, data exchange can occur in both directions simultaneously allowing a single channel to be used efficiently. However, in the specific application shown in FIG. 1, the Series/1 computer cannot communicate in full-duplex mode. Thus, the present invention was developed as a non-standard approach by using two half-duplex channels to simulate a full-duplex channel. This is illustrated in FIG. 2, to which reference is now made.

Figure 2:
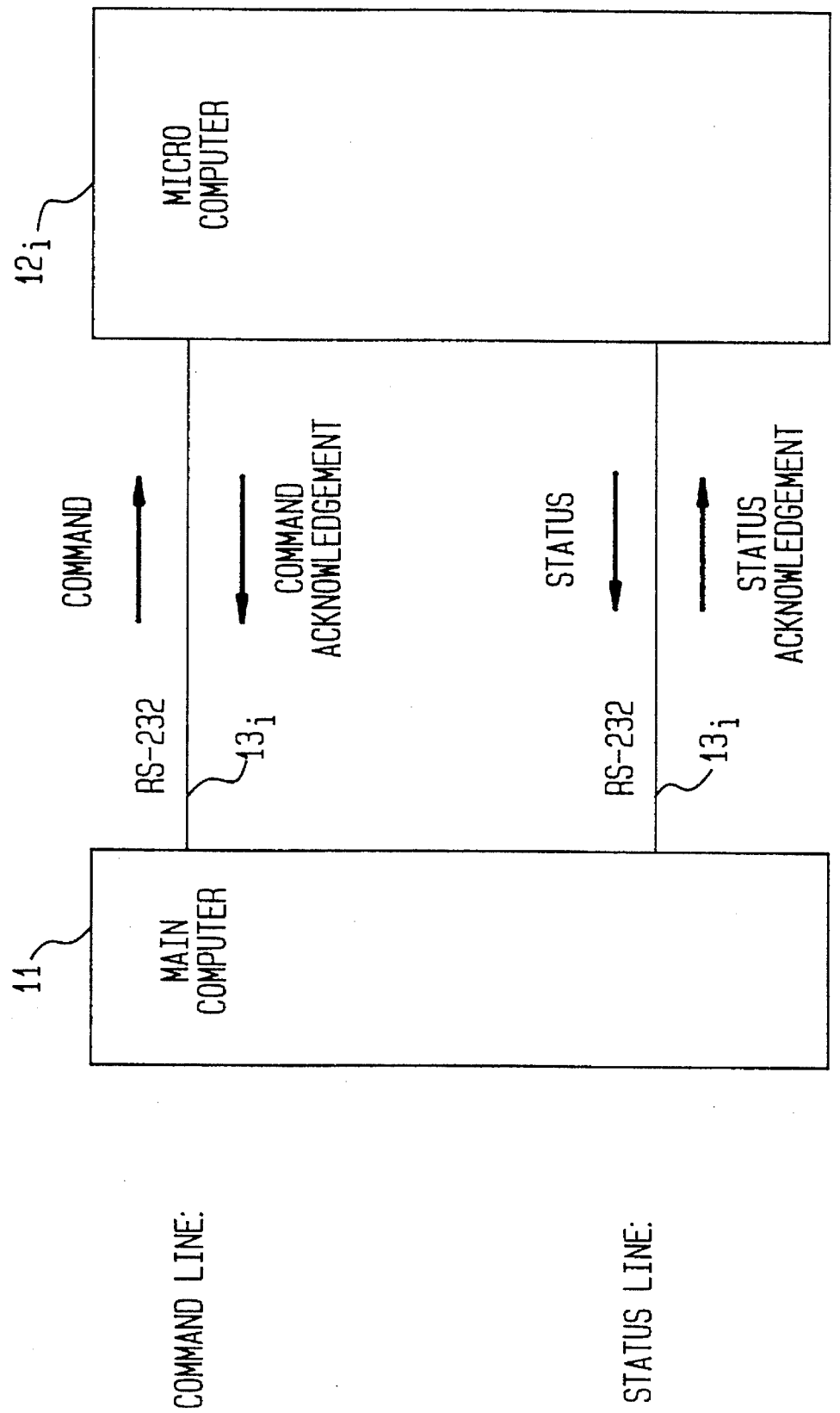
FIG. 2 is a high level block diagram showing the basic operation of the invention.

In FIG. 2, only the connections between the main computer 11 and one micro computer $12_1$ are illustrated. It will be understood, however, that similar connections are made between the main computer 11 and each of the microcomputers $12_l$ to $12_n$. In the configuration shown in FIG. 2, there are two types of communication; command communication from the main computer 11 to the micro computer $12_i$ and status communication from the micro computer $12_i$ to the main computer 11. When the main computer 11 communicates one or more tasks or commands to micro computer $12_i$ in order to, say, begin a tool motion, the main computer 11 is considered the master and the micro computer is the slave. On the other hand, when the micro computer $12_i$ has finished the tasks or commands, it initiates communication with the main computer 11 to update its progress. In this case, the micro computer $12_i$ is considered the master and the main computer 11 is the slave. In this way, the main computer 11 coordinates the operations of the several micro computers $12_l$ to $12_n$ in order to maintain the correct sequence of operations by the tool.

Figure 3:
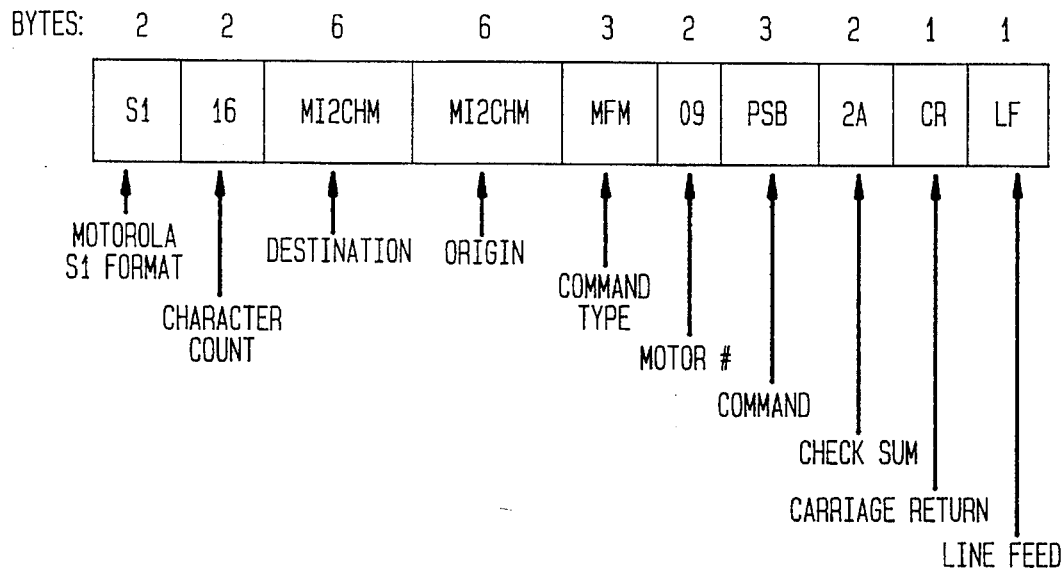
FIG. 3 is a diagram illustrating a typical command string using framing characters.
Figure 4:
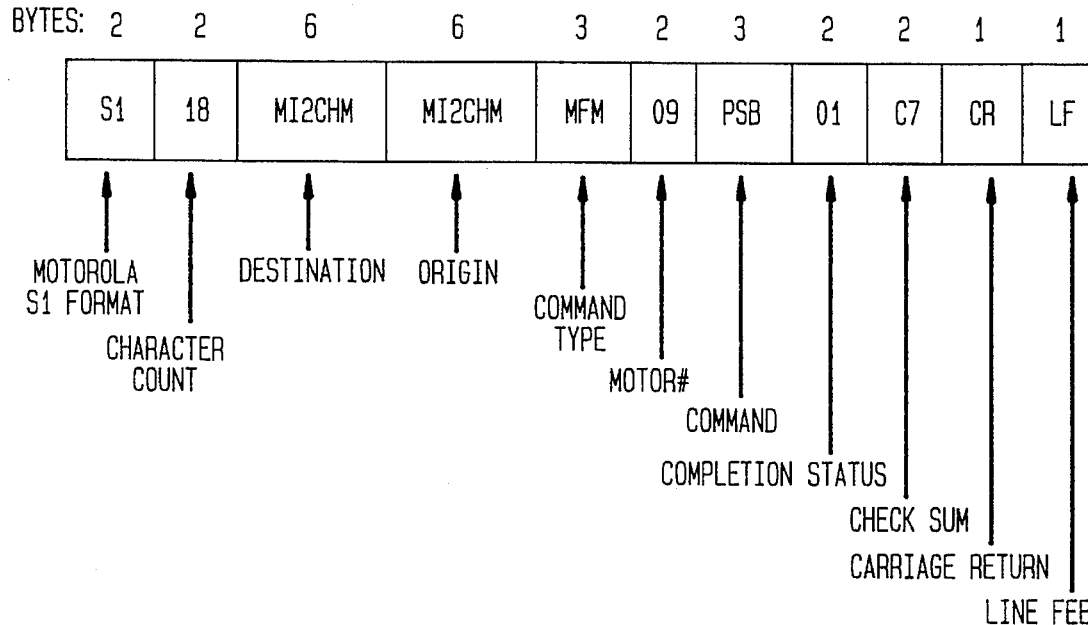
FIG. 4 is a diagram illustrating a typical status string using framing characters.
Figure 5:
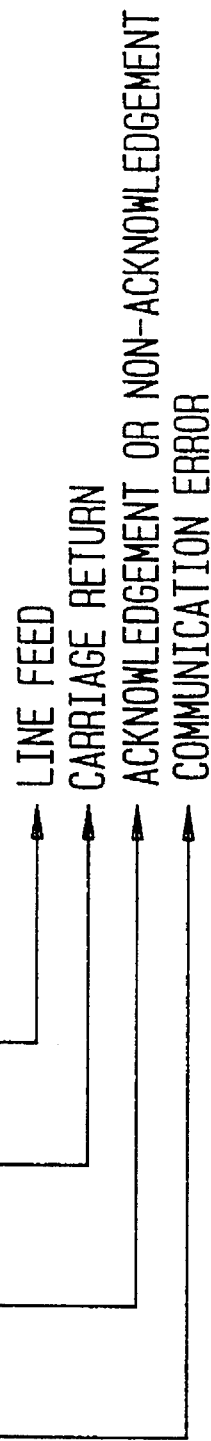
FIG. 5 is a diagram illustrating a typical command and status acknowledgement string.

The tool control software running on the main computer 11 and the micro computers $12_l$ to $12_n$ uses a string of characters to initiate the data transfer from the master to the slave. For example, when the Series/1 computer 11 wants to initiate a task, it transmits a command string down to a micro computer $12_i$ over its command channel. A typical command string is shown in FIG. 3 and uses framing characters, character count, checksum, data and terminating characters. An acknowledgement response, as shown in FIG. 5, is returned back to the Series/1 on the same channel. The micro computer $12_i$ now acts autonomously to compete its task. Upon completion, it sends a status string, as shown in FIG. 4, on the status channel to update the Series/1 computer 11. An acknowledgement response, again as shown in FIG. 5, is returned back to the micro computer $12_i$ by the main computer 11 on the same channel.

In order to simplify interface problems, minimal handshaking lines are used. RTS, CTS, DSR and DTR lines are all tied to an active state, and software is used to simulate the hardware handshaking. This software solution consists of a bi-directional control of data and timing dwells. On a half-duplex channel, the bi-directional control of data is necessary to prevent interference. Although this control is usually performed by handshake lines, a less cumbersome method is implemented according to the teaching of this invention:

1. When transmitting a command string (FIG. 3) from the main computer to a micro computer, an acknowledgement string (FIG. 5) must be returned back to the main computer before a subsequent command can be sent. This assures that the main computer will not be trying to transmit a second command when it should be preparing to receive acknowledgement data.

Figure 6:
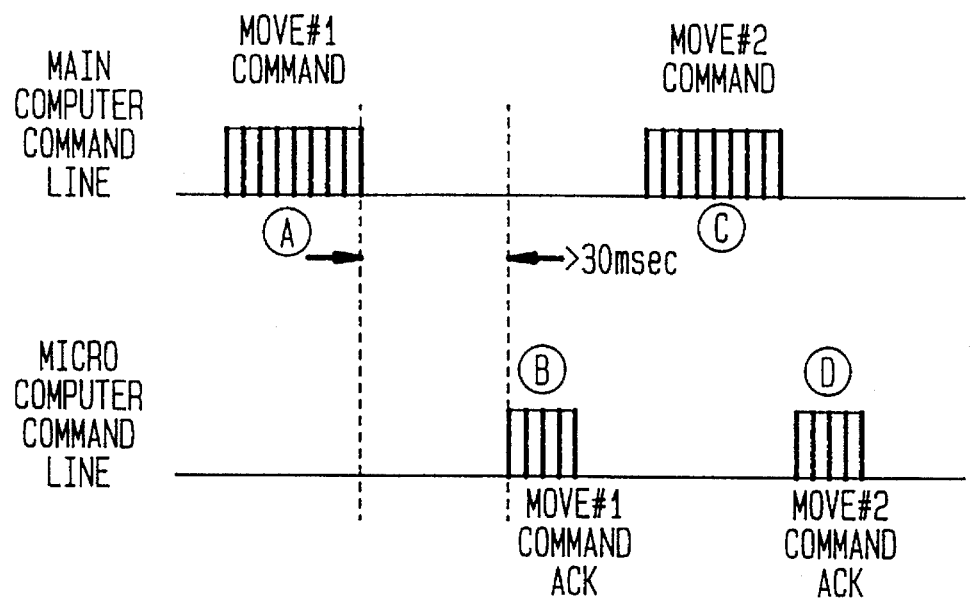
FIG. 6 is a timing diagram showing the transmission of command strings from a main computer to a micro computer and the acknowledgement responses by the micro computer over the same channel.
Figure 7:
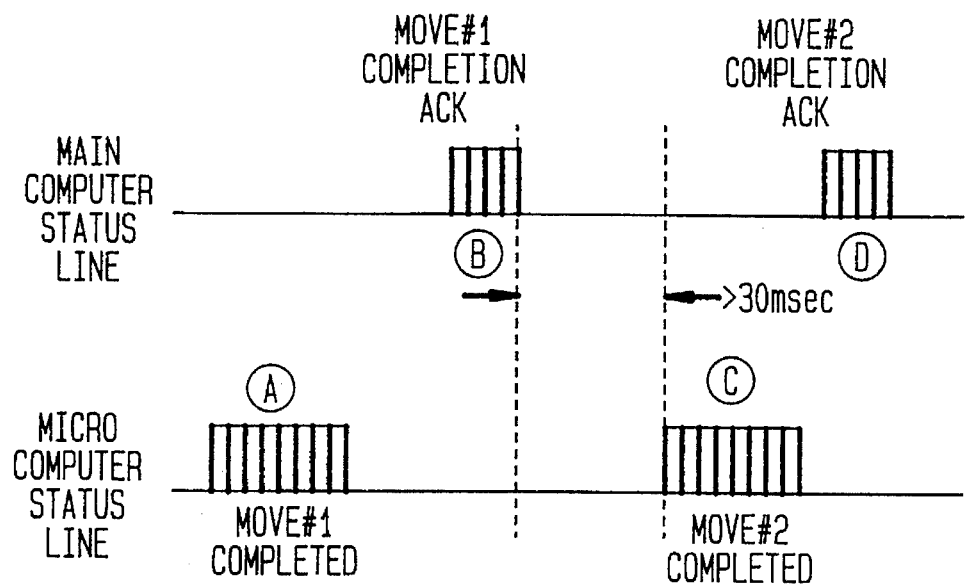
FIG. 7 is a timing diagram showing the transmission of status strings from a micro computer to a main computer and acknowledgement responses by the main computer over the same channel.

2. When transmitting a status string (FIG. 4) from the micro computer to the main computer, an acknowledgement string (FIG. 5) must be returned back to the micro computer before it can report status on the next completed task. This ensures that the micro computer will not be trying to transmit a second status message when it should be preparing to receive acknowledgment data. This protocol is shown in FIGS. 6 and 7 where the master initiates the communication and the slave acknowledges receipt of the communication. With reference first to FIG. 6, the main computer 11 first acts as the master by transmitting command communications at A and C to, in our example, micro computer $12_i$. Upon receiving each command communication, the micro computer $12_i$, acting as a slave, transmits command acknowledgements at B and D to the main computer 11. Once the tool movement or other task is completed by the micro computer $12_i$, it becomes the master and attempts to interrupt the main computer 11. As shown in FIG. 7, the micro computer $12_i$ transmits a string of characters at A signaling completion or failure of the task to update the sequence of the tasks performed by the tool. Subsequently, an acknowledgement is returned at B by the main computer 11, acting as the slave, to the micro computer $12_i$, acting as the master, confirming successful reception of the string. This is done for each status communication, such as at C, with a corresponding acknowledgement, such as at D.

From this example, it can be seen that the main computer 11 and the micro computers $12_1$ to $12_n$ will alternate from the status of a master to a slave. This state change of each computer is what precludes the use of the standard hardware RS-232 handshaking protocol.

Figure 8:
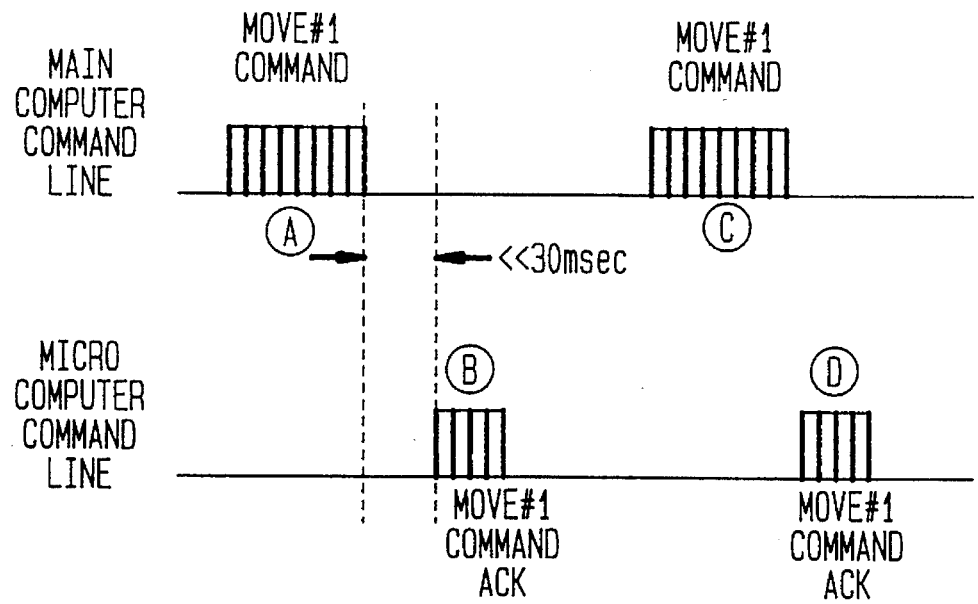
FIG. 8 is a timing diagram, like FIG. 6, showing a command communication timing problem due to the READ/WRITE cycle of the main computer.

A sensitive issue with this configuration is the timing between the computers; that is, the internal WRITE/READ cycle time within each computer. Following the transmission of a command string (WRITE), the main computer 11 must be ready to accept the acknowledgement (READ). If the acknowledgement from the micro computer $12_i$ arrives sooner than the WRITE/READ cycle time capability of the main computer 11, the acknowledgement will be truncated. This possibility is illustrated in FIG. 8 where the acknowledgement at B arrives in very much less than 30 msec. which, for the IBM Series/1 computer, is less than the READ/WRITE cycle time for that computer.

Figure 9:
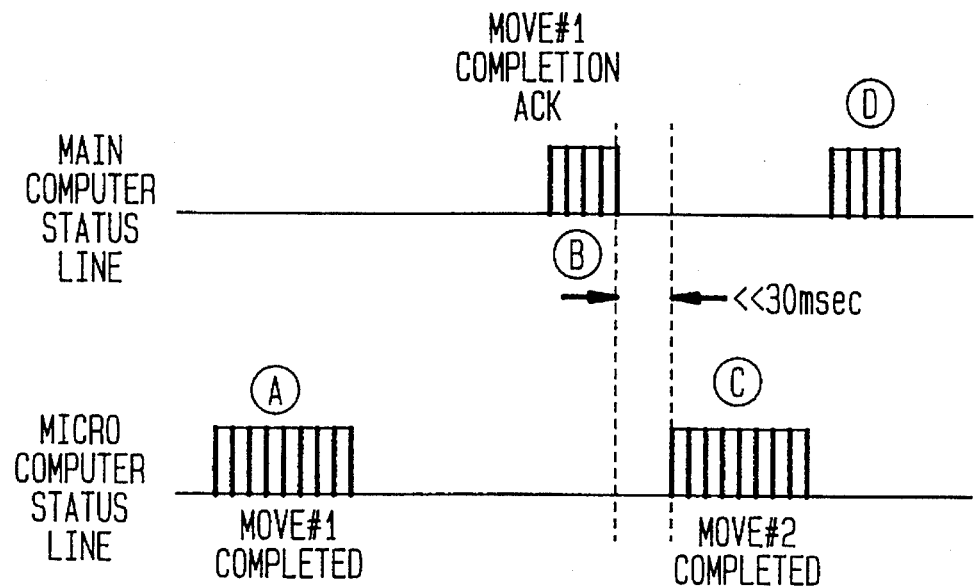
FIG. 9 is a timing diagram, like FIG. 7, showing a status communication timing problem due to the READ/WRITE cycle of the main computer.

Acknowledgements arriving near the WRITE/READ cycle time capability will be truncated intermittently. A similar situation can take place during the transmission of a status string, as illustrated in FIG. 9. In this example, the micro computer $12_i$ transmits a status string for the second move at C to the main computer 11 immediately after receiving the acknowledgement from the main computer at B. Again, the status transmission comes in less than the READ/WRITE cycle time for the main computer 11.

As mentioned earlier, in a specific implementation of the invention shown in FIG. 1, the main computer 11 is an IBM System/1 computer and there are four micro computers $12_1$ to $12_4$. In this configuration, the main computer is the older technology and has a longer WRITE/READ cycle although it has greater storage and processing capacity than the micro computers. The inherent modularity of the system shown in FIG. 1, however, allows for either the main computer 11 or the micro computers $12_1$ to $12_n$ to be upgraded. As a result, the WRITE/READ cycles of the computers used will be different depending on the specific configuration of computers. In other words, it may be that in some installations that the WRITE/READ cycles of the micro computers, or at least some of them, will be longer than that of the main computer. In fact, as will become clear from the following discussion, it is possible that the relative WRITE/READ cycle times for each combination of main and micro computer is different.

To achieve error free communication, an accurate WRITE/READ cycle time must be determined by analyzing the hardware characteristics of each device. By using a worst case approximation in the analysis, the resultant timing values can then be substituted as software dwells within the communication program.

Figure 10:
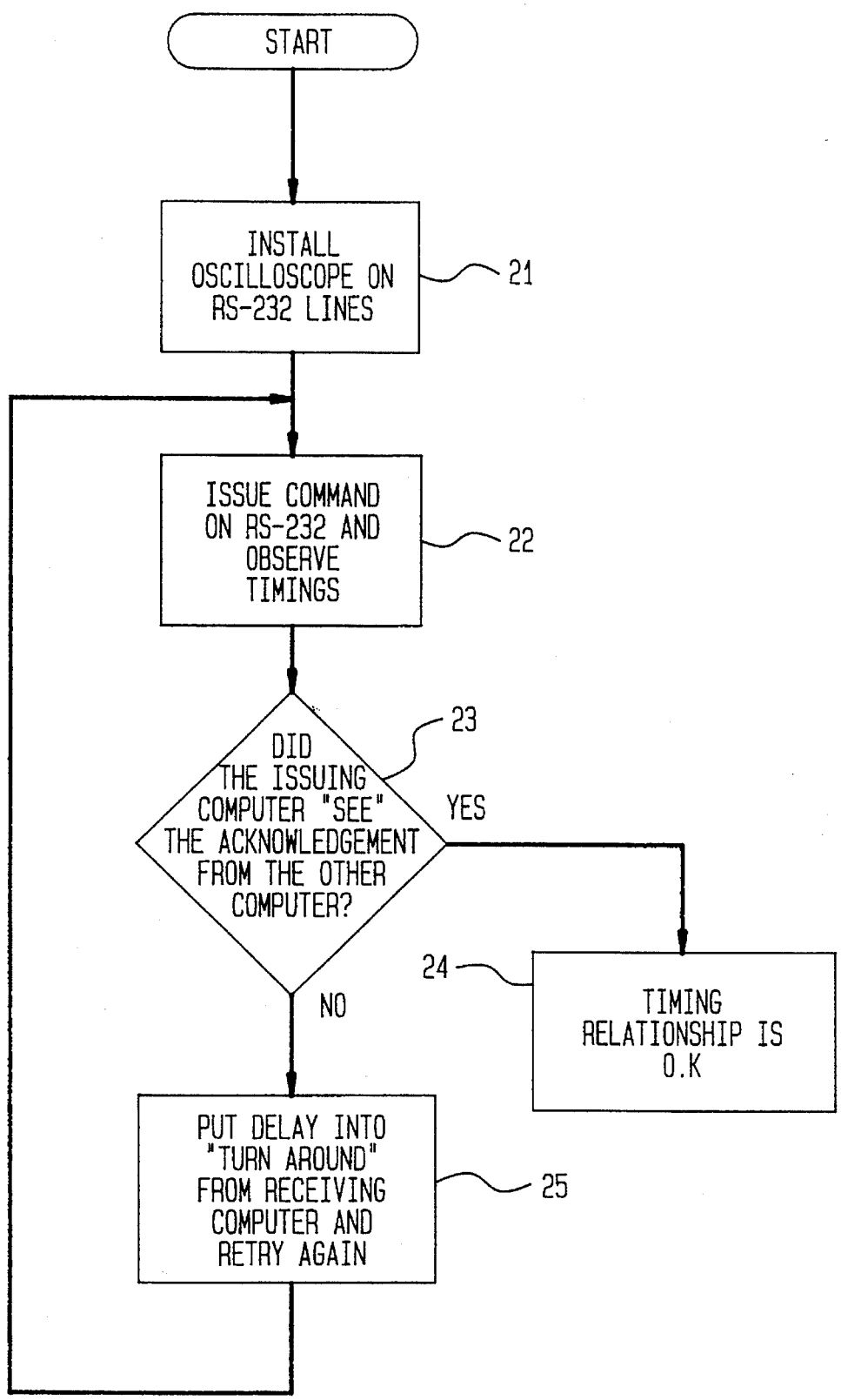
FIG. 10 is a flowchart showing the procedure for determining dwell times to be added to the communications software.

FIG. 10 is a flowchart showing the procedure to determine the required dwell time. First, install an oscilloscope channel on the transmit data line (RS-232 , pin 2) and another channel on the receive data line (RS-232 , pin 3) at step 21. In step 22, begin by transmitting a command string from the main computer to the micro computer. Using the oscilloscope, determine the time difference between the two at step 23. If the main computer received the full acknowledgement as sent, no dwell time is needed on the micro computer side, and the procedure ends at step 24. However, if the main computer received a truncated acknowledgement, a dwell is necessary on the micro computer side. This dwell time essentially slows the response time of the micro computer so that the main computer will be ready to accept the acknowledgement. The duration of the dwell is the time difference determined by the oscilloscope. This value plus some small buffer value is added in step 25, and the procedure is repeated until the timing relationship has been determined to be all right. This same dwell will be incorporated into the software of all the micro computers, if they are of the same type. If the micro computers differ, the same procedure must be performed for each of them.

In order to avoid the tedious task of analyzing the hardware characteristics of each computer and its relation to the rest of the system each time the system is upgraded by the substitution of a main computer 11 or one or more micro computers $12_i$, it is desirable to perform this process automatically. Note that all the micro computers $12_1$ to $12_n$ need not be identical with the same WRITE/READ cycles, so it is possible that while the WRITE/READ cycle of, say, micro computer $12_1$ may be faster than that of the main computer 11, the WRITE/READ cycle of the main computer 11 could be faster than that of, say, micro computer $12_2$.

In order to determine the correct software dwells when the system of FIG. 1 is originally set up or when one or more of the computers in the system is upgraded, the following process is followed. First, the main computer 11 polls each of the micro computers $12_1$ to $12_n$ and waits for an acknowledgement from each in turn. The time for the acknowledgement is timed by the main computer. If an acknowledgement is not registered for a micro computer, it is polled again but this time a predetermined guard time is added by the micro computer before sending the acknowledgement. The process is repeated with the guard times being accumulated and stored by each micro computer until it is no longer polled by the main computer. The accumulated guard times constitute the software dwell for that micro computer. Next, each micro computer sends a test message to the main computer 11 and waits for an acknowledgement, and the same procedure is followed by the main computer 11 to determine the software dwells that must be incorporated within its communication protocol for each of the micro computers.

Figure 11:
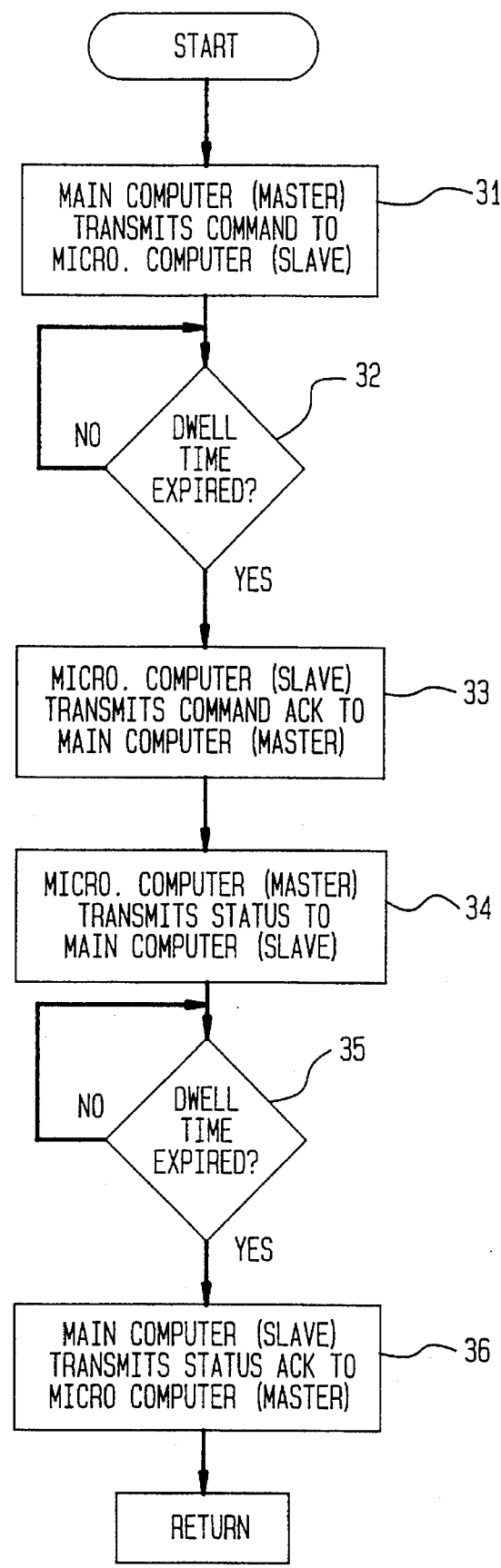
FIG. 11 is a flowchart illustrating the logic of the software protocol according to the invention.

Having established the software dwells, the software sequence according to the invention is shown in FIG. 11, to which reference is now made. In function block 31, the main computer 11, acting as a master, transmits a command to a micro computer 12$_i$, acting as a slave. The micro computer 12$_i$ performs a software dwell, as indicated by decision block 22, and then returns a command acknowledgement in function block 23. Upon task completion, the micro computer 12$_i$, acting as a master, transmits a status to the main computer 11, acting as a slave, in order to update tool progress, as indicated in function block 24. The main computer 11 performs a software dwell, as indicated by decision block 25, and then returns a status acknowledgement in function block 26.

A software dwell prior to both the command acknowledgement or status acknowledgement is not always necessary. Often, a dwell must be incorporated only within the faster of the two computers. This dwell essentially slows the faster computer by enough so that the slower computer will be ready to accept the acknowledgement.

The invention is applicable to any node to node computer communication involving standard RS-232 configuration. It provides both a flexible communication architecture and a less complicated wiring scheme. Thus, while the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method of asynchronous full-duplex communications between two or more computers connected via separate serial communications links comprising the steps of:

measuring relative READ/WRITE cycle times for each of said computers by transmitting over a serial channel from a first computer to a second computer a data string and responding by the second computer with an acknowledgement over said serial channel and determining whether the first computer sees the acknowledgement and repeating the process by transmitting a dam string from the second computer to the first computer over said serial channel and responding by the first computer with an acknowledgement over said serial channel; and adding a delay in the form of a software dwell time in a time period between receiving a data string and responding with an acknowledgement as necessary to allow said computers to see the acknowledgements from computers to which data strings were transmitted over said serial channel.

2. The asynchronous communication method recited in claim 1 further comprising the steps of:

initiating by said first computer, acting as a master, a first communication to a second computer by transmitting a data string to said second computer, acting as a slave;

returning by said second computer an acknowledgement to said first computer;

asynchronously initiating by said second computer, acting as a master, a second communication to said first computer by transmitting a data string to the first computer, acting as a slave; and returning by said first computer an acknowledgement to said second computer.

3. The asynchronous communication method recited in claim 2 wherein said second computer, in response to said first communication, performs a software dwell if added as a result of said measuring step before returning an acknowledgement to said first computer.

4. The asynchronous communication method recited in claim 2 wherein said first computer, in response to said second communication, performs a software dwell if added as a result of said measuring step before returning an acknowledgement to said second computer.

5. The asynchronous communication method as recited in claim 2 wherein said first communication is a command to perform one or more tasks and said second communication is status communication initiated by said second computer upon completion or failure to complete each task.

6. The asynchronous communication method recited in claim 1 wherein the step of measuring is performed once upon interconnection of said computers.

7. The asynchronous communication method recited in claim 6 wherein the step of measuring is performed automatically by each computer polling other computers to which it is connected.

* * * * *

UNITED STATES PATENT AND TRADEMARK OFFICE
CERTIFICATE OF CORRECTION

PATENT NO. : 5,481,675
DATED : January 2, 1996
INVENTOR(S) : Chris T. Kapogiannis, John F. Harmuth It is certified that error appears in the above-identified patent and that said Letters Patent is hereby corrected as shown below:

In column 3, line 60:  change "$132_2$" to --$13_2$--.

In column 5, line 63:  change "121" to --$12_1$--.

In column 7, line 43, (Claim 1):  change "dam" to --data--.

Signed and Sealed this

Nineteenth Day of November, 1996

BRUCE LEHMAN

*Attest:*

*Attesting Officer*       *Commissioner of Patents and Trademarks*